(12) United States Patent
Mocek et al.

(10) Patent No.: US 6,219,670 B1
(45) Date of Patent: *Apr. 17, 2001

(54) METHOD AND APPARATUS FOR FILTERING A TABLE LIST BEFORE OPENING WITH A GRAPHICAL USER INTERFACE

(75) Inventors: Darryl Jon Mocek; Shih-Shan Tan, both of San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,316

(22) Filed: Feb. 18, 1998

(51) Int. Cl.[7] .................................................. G06F 17/00
(52) U.S. Cl. .................................. 707/102; 707/3; 707/7
(58) Field of Search ................................ 400/578, 615.2; 707/1–206, 500–530

(56) References Cited

U.S. PATENT DOCUMENTS

| | | | | |
|---|---|---|---|---|
| 4,221,003 | * | 9/1980 | Chang et al. | 707/100 |
| 5,418,950 | * | 5/1995 | Li et al. | 707/4 |
| 5,421,008 | * | 5/1995 | Banning et al. | 707/4 |
| 5,584,591 | * | 12/1996 | Mori et al. | 400/615.2 |
| 5,748,954 | * | 5/1998 | Mauldin | 707/10 |
| 5,878,408 | * | 3/1999 | Van Huben et al. | 707/200 |
| 5,893,087 | * | 4/1999 | Wlaschlin et al. | 707/3 |
| 5,999,940 | * | 12/1999 | Ranger | 707/103 |

* cited by examiner

Primary Examiner—Thomas Black
Assistant Examiner—David Jung
(74) Attorney, Agent, or Firm—Kudirka & Jobse, LLP

(57) ABSTRACT

A method, apparatus, and article of manufacture for a filter table list utility. Information is displayed on a monitor attached to a computer. An open database window is displayed in which search criteria is entered for searching for tables. A search is performed for tables using the entered search criteria, prior to retrieving names of all of the tables to display on the monitor. When tables are found that meet the search criteria, a list of the found tables is generated for displaying on the monitor. The generated list is displayed on the monitor.

12 Claims, 6 Drawing Sheets

METHOD AND APPARATUS FOR FILTERING A TABLE LIST BEFORE OPENING WITH A GRAPHICAL USER INTERFACE

BACKGROUND OF THE INVENTION

1. Field of the Invention

The present invention relates generally to graphical user interfaces, and in particular, to a method, apparatus, and article of manufacture for filtering a table list before opening with a graphical user interface.

2. Description of the Related Art

Graphical user interfaces (GUIs) have greatly enhanced the usability and productivity of computer software. In most GUIs, such as found in operating systems such as Microsoft Windows (3.x, 95, and NT), IBM OS/2, Apple Macintosh, and some versions of the UNIX operating system, data is supplied to a user through one or more windows or views.

In conventional systems, a GUI is displayed that enables a user to open a table of a database. Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In a conventional system, when a user wants to open a table in a database, a GUI that includes a window is displayed for the user. The window typically includes a File|Open menu and/or a Browse command. Upon selection of the File|Open menu, an Open Database window is displayed that includes the list of databases, a "Look in" dropdown list box for selecting a server to be searched, a "File name" edit box for selecting a database from which tables are to be retrieved, and a "Files of type" dropdown list box for specifying a file type (i.e., the file type could be "IBM DB2 (*)" or "all file types"). When the Open Database window appears, the user selects the "Files of type" dropdown list box to select a file type. For example, to select a DB2 table, the user selects an "IBM DB2 (*)" file type. At this point the IBM DB2 Open Database Connectivity ("ODBC") login window appears and the user logs in.

Once logged in, the Open Database window reappears with the name of the connection (e.g., userid@DB2 ). The user selects the connection and is presented with a list of databases or schema from which to select. The user selects a database or schema and is presented with a list of tables. In a conventional system, displaying the tables for databases which contain a large number of tables takes a long time. Also, since the list is potentially very large, the user may have a difficult time finding the desired table.

In some current systems, a user can enter a database search that will limit the tables that are displayed. However, these systems will retrieve all tables, which is time consuming, and then search for the requested tables. Consequently, a significant need exists for a utility that allows a user to filter table lists more efficiently.

SUMMARY OF THE INVENTION

To address the requirements described above, the present invention discloses a method, apparatus, and article of manufacture for a filter table list utility. According to the present invention, information is displayed on a monitor attached to a computer. An open database window is displayed in which search criteria is entered for searching for tables. A search is performed for tables using the entered search criteria, prior to retrieving names of all of the tables to display on the monitor. When tables are found that meet the search criteria, a list of the found tables is generated for displaying on the monitor. The generated list is displayed on the monitor.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
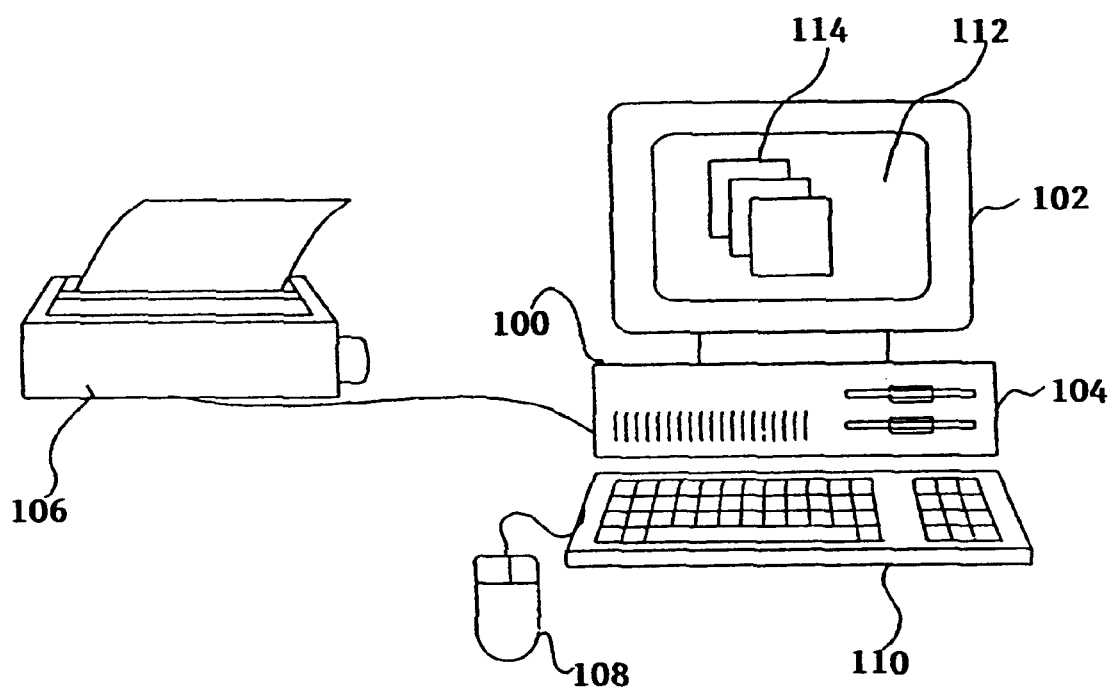
FIG. 1 is an exemplary hardware environment used to implement the preferred embodiment of the invention.

FIG. 1 is an exemplary hardware environment used to implement the preferred embodiment of the invention. The present invention is typically implemented using a personal computer 100, which generally includes, inter alia, a processor, random access memory (RAM), read only memory (ROM), a video card, bus interface, and/or other components. It is envisioned that attached to the personal computer 100 may be a monitor 102 (e.g., a CRT, an LCD display, or other display device), data storage devices 104 such as hard, floppy, and/or CD-ROM disk drives, and peripherals, such as a printer 106. Also included in the preferred embodiment may be input devices, for example, a mouse pointing device 108 and a keyboard 110. Those skilled in the art will recognize that any combination of the above components, or any number of different components, peripherals, and other devices, may be used with the computer 100.

The personal computer 100 operates under the control of an operating system 112, which is represented in FIG. 1 by the screen displayed on the monitor 102. The present invention is usually implemented in one or more computer programs 114 that operate under the control of the operating system 112, which programs 114 are represented in FIG. 1 by the windows displayed within the screen on the monitor 102. However, it should be understood that, in the alternative, the principles of the invention may also apply to specific utilities or functions within the operating system 112 itself. In general, the functions performed in the present invention, whether implemented as part of an operating system or a specific application, will be referred to herein as "computer programs".

Generally, the computer programs which implement the preferred embodiment of the invention are embodied in or readable from a computer-readable device, medium, or carrier, e.g., one or more of the fixed and/or removable data storage data devices 104 and/or remote devices coupled to the computer 100 via data communications devices connected to the computer 100. Under control of operating system 112, the computer programs 114 may be retrieved from the data storage devices or remote devices into the memory of computer 100. The computer programs comprise instructions which, when read and executed by computer 100, cause the computer 100 to perform the steps necessary to execute the steps or elements of the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Filter Table List

The present invention is a Filter Table List utility or computer program that comprises a dockable window (miniframe window) that enables a user to filter a list of tables prior to the list of all of the tables being retrieved from a database. The Filter Table List utility provides the capability for a user to specify a search criteria in the Open Database window at the point where the list of databases or schema are displayed. The Filter Table List utility is typically used with SQL back-ends, and, considering that power users are most likely to run into the problem of receiving large table lists, the Filter Table List utility is especially advantageous for them.

In the preferred embodiment, the Filter Table List utility enables a user to specify a search criteria within the "File name" edit box of the Open Database window. The filter table list uses this search criteria to search a database or schema for tables that match the search criteria before retrieving the list of tables that are in that database or schema. The search criteria indicates a characteristic of the tables, for example, a name or a portion of a name.

Standard GUI mechanisms are preferably implemented to permit the display characteristics of the Open Database window to be modified in much the same manner as any window. It should be appreciated that these functions are standard in many GUI environments, and well understood by those of ordinary skill in the art. Implementation of these mechanisms is well known in art, and include such functions as minimizing, maximizing, closing, opening, resizing, repositioning, etc., the Open Database window.

The Filter Table List utility is automatically invoked by the user entering search criteria. In the present embodiment, the filter table list is invoked within the APPROACH® application program sold by Lotus Development Corporation, a wholly-owned subsidiary of IBM Corporation, the assignee of the present invention. The APPROACH® application program is a database management system (DBMS) often purchased as part of the LOTUS® SMARTSUITE® office productivity package. Of course, those skilled in the art will recognize that the Filter Table List utility could be used with other products as well.

Figure 2A:
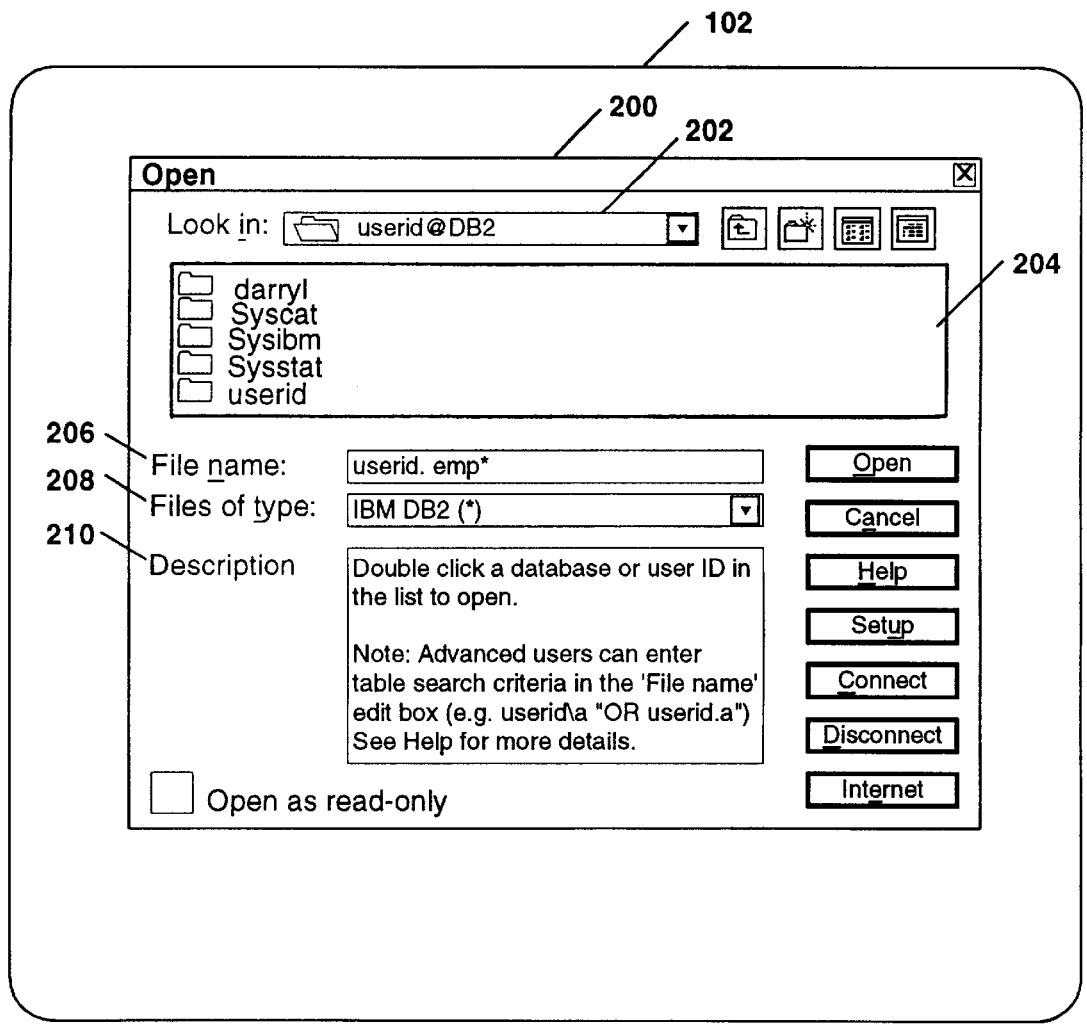
FIGS. 2A–2B illustrate graphical user interfaces (GUIs) displayed on a monitor according to the present invention.
Figure 2B:
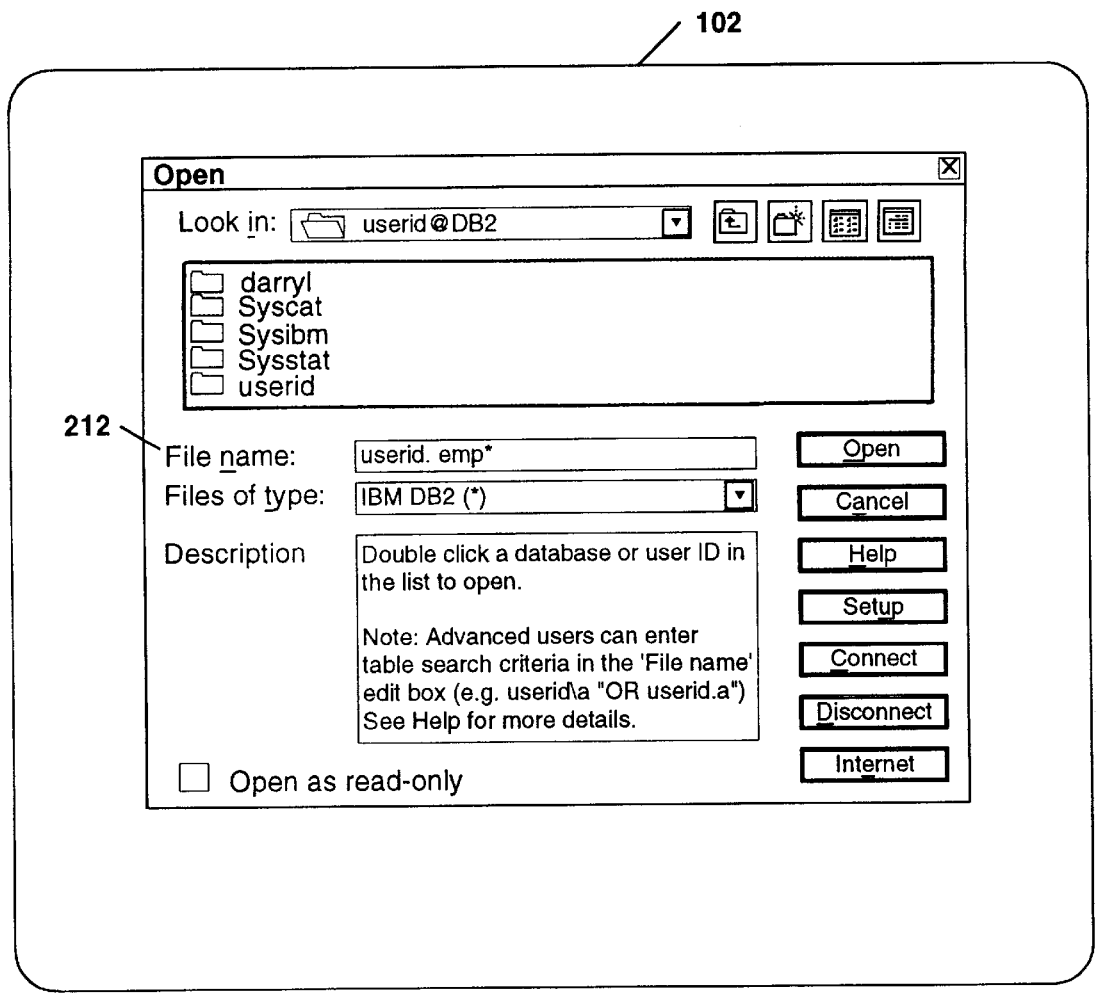

FIGS. 2A–2B illustrate graphical user interfaces (GUIs) displayed on a monitor according to the present invention. As illustrated in FIG. 2A, the GUI is an Open Database window 200 that includes a "Look in" dropdown list box 202, a list of databases or schema 204, a "File name" edit box 206, a "Files of type" dropdown list box 208, and a "Description" text box 210. A user specifies a server, which has been connected, using the "Look in" dropdown list box 202. A user can select a database or schema from the list of databases 204. A user can specify a database or schema to be searched for tables by entering a name in the "File name" edit box 206. A user can select the type of databases to be connected by entering a file type in the "Files of type" dropdown list box 208. Additionally, the user can view instructions for using the GUI by viewing the "Description" text box 210.

FIGS. 2A–2B are snapshots of the Open Database window 200 after the user has selected a connection and logged in. The user then views the list of databases or schema 204 to which the user has access. At this point, if the user double clicks on a database or schema name, the user will see a list of all of the tables in that database or schema. Similarly, if the user enters the name of the database in the "File name" edit box and selects the "Enter" key or clicks on the "Open" button, the user will see a list of all of the tables in that database.

The filter table list, however, enables a user to filter the list of tables prior to the list of tables being displayed in the GUI. In particular, the user can enter the name of the database or schema followed by a separator, such as a dot ('.') 206, as illustrated in FIG. 2A, or a backslash ('\') 212, as illustrated in FIG. 2B, and then enter a search criteria. The user can also select a database or schema 204 and enter a search criteria 206. Then, the filter table utility searches for all of the tables that match the search criteria entered before retrieving the list of tables. The filter table list is advantageous in that the filter table list avoids retrieving unnecessary tables from the list. By filtering the list of tables prior to retrieval, the Filter Table List utility saves time and other resources. The dot notation (e.g., database.table) and the backslash notation are common in SQL, which enables users who are familiar with SQL to be especially comfortable entering the search criteria. For a file name without a dot or a backslash notation, if a database or schema is selected or double clicked, the file name is a table search criteria, otherwise, the file name is a database or schema to be opened.

Flowcharts

Figure 3:
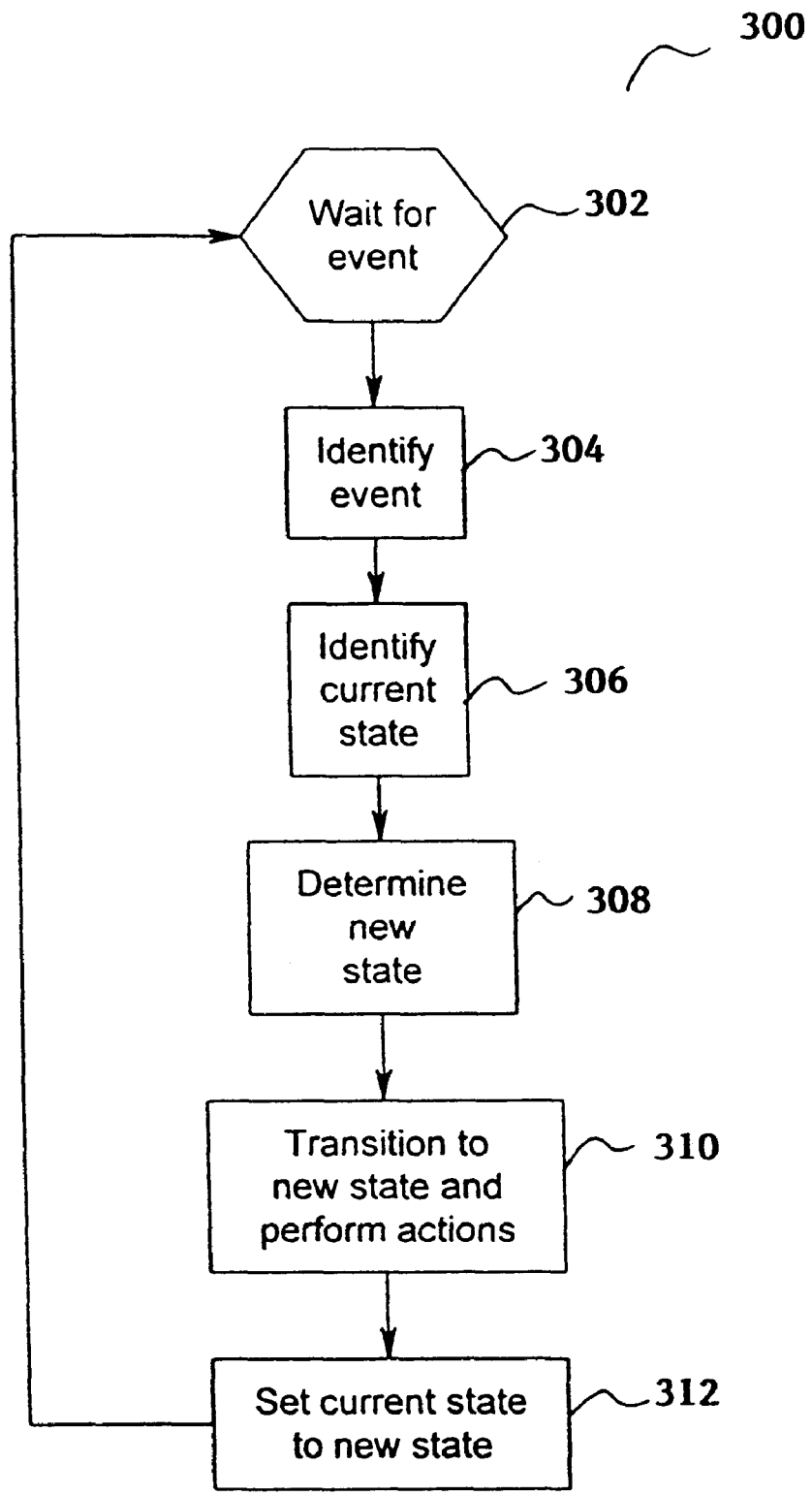
FIG. 3 is a flowchart that illustrates the general logic of a message or event-driven operating system performing the steps of the present invention.

FIG. 3 is a flowchart that illustrates the general logic of a message or event-driven operating system 112 performing the steps of the present invention. In such a system 112, operations are performed when transitions are made, based upon the receipt of messages or events, from present or current states to new states.

Generally, routine 300 begins by waiting at block 302 for an event (e.g., a mouse button click). It should be appreciated that during this time, other operating system 112 tasks, e.g., file, memory, and video tasks, etc., may also be carried out. When an event occurs, control passes to block 304 to identify the event. Based upon the event, as well as the current state of the system 112 determined in block 306, a new state is determined in block 308. In block 310, the routine 300 transitions to the new state and performs any actions required for the transition. In block 312, the current state is set to the previously determined new state, and control returns to block 302 to wait for more input events.

The specific operations that are performed by block 310 when transitioning between states will vary depending upon the current state and the event. The various operations required to implement and maintain the Navigator of the present invention represent particular events handled by routine 300. However, it should be appreciated that these operations represent merely a subset of all of the events handled by any operating system 112.

Figure 4:
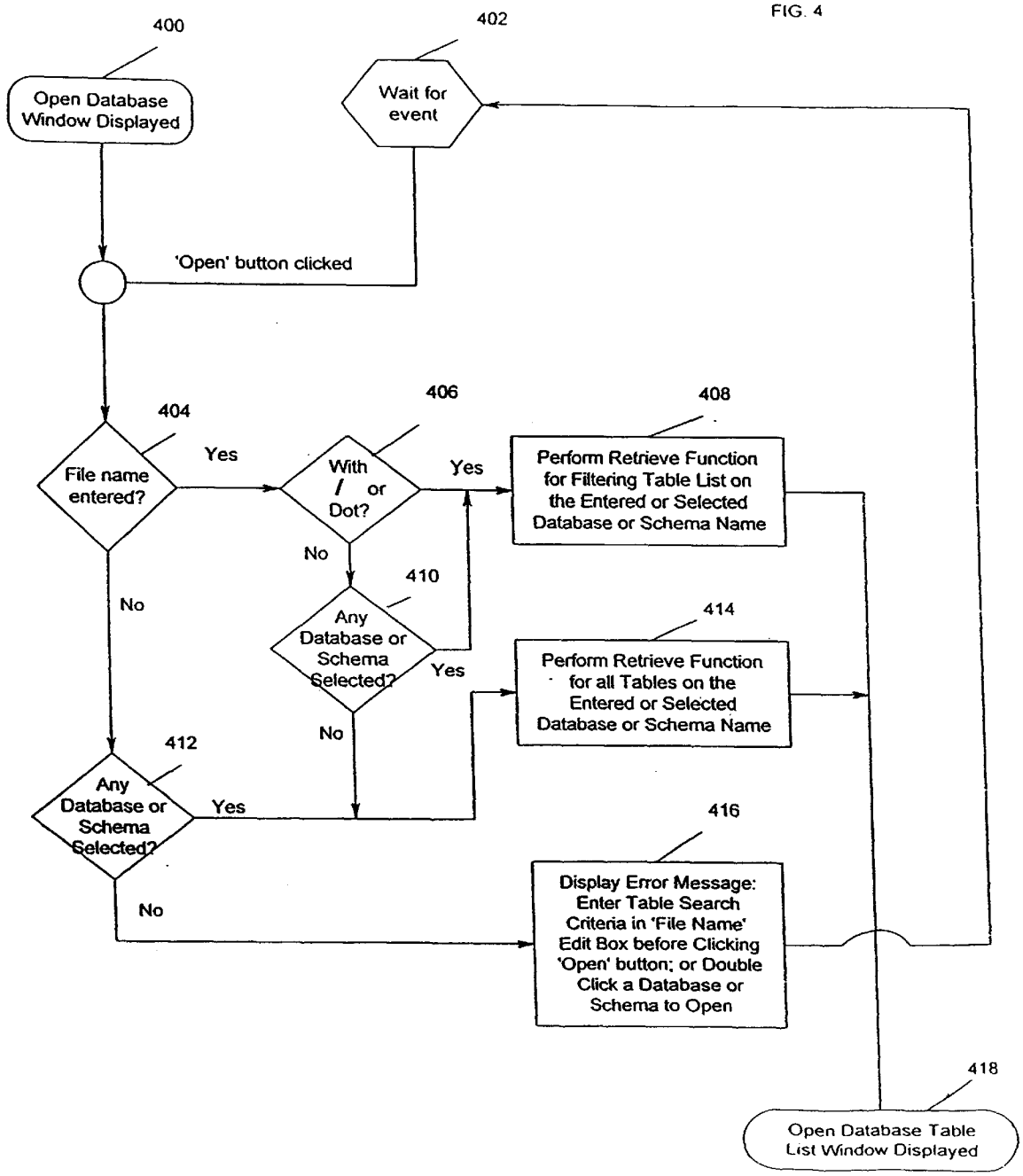
FIG. 4 is a flowchart that illustrates the general logic for a routine 400 that is performed by the Filter Table List utility to process an 'Open'.

FIG. 4 is a flowchart that illustrates the general logic for a routine 400 that is performed by the Filter Table List utility to process an 'Open'. Generally, routine 400 begins by waiting at Block 402 for an event (e.g., a mouse button click signifying selection of a menu item). When an event occurs, control passes to blocks 404–418 to identify the events and perform associated functions. Block 404 represents the computer 100 determining whether a file name was entered. If a file name was entered, control passes to Block 406, otherwise, control passes to Block 412. Block 406 represents the computer 100 determining whether the file name contained a backslash or a dot. If the file name contains a backslash or a dot, control passes to Block 408, otherwise, control passes to Block 410. Block 408 represents the computer 100 performing the retrieve function for filtering a table list on the entered or selected database or schema name, which is specified before a backslash or dot of the file names or of the selected database or schema. Block 410 represents the computer 100 determining whether any database or schema has been selected. If a database or schema has been selected, control passes to Block 408, otherwise, control passes to Block 414.

Block 412 represents the computer 100 determining whether any database or schema has been selected. If a database or schema has been selected, control passes to Block 414, otherwise, control passes to Block 416. Block 414 represents the computer 100 performing the retrieve function for all tables on the entered or selected database or schema name. Block 416 represents the computer 100 displaying an error message that states "Enter Table Search Criteria in 'File Name' Edit Box before Clicking 'Open' button; or Double Click a Database or Schema to Open." Block 418 represents the computer 100 displaying an open database table list window.

Figure 5:
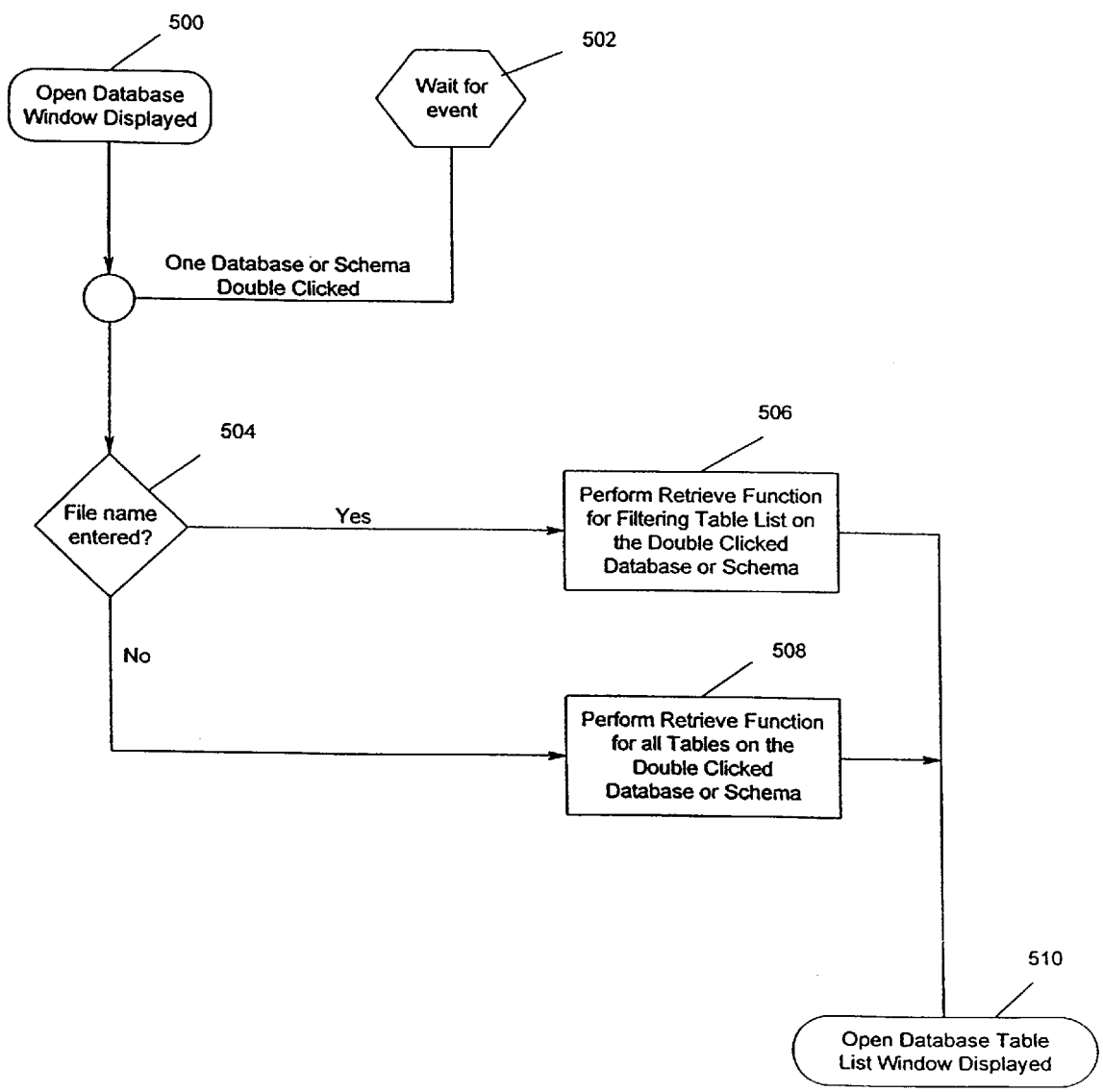
FIG. 5 is a flowchart that illustrates the general logic for a routine 500 that is performed by the Filter Table List utility to process a double-clicked database or schema.

FIG. 5 is a flowchart that illustrates the general logic for a routine 500 that is performed by the Filter Table List utility to process a selected database or schema (e.g., the database or schema has been double-clicked). Generally, routine 500 begins by waiting at Block 502 for an event (e.g., a mouse button click signifying selection of a menu item). When an event occurs, control passes to blocks 504–510 to identify the events and perform associated functions. Block 504 represents the computer 100 determining whether a file name was entered. Block 506 represents the computer 100 performing the retrieve function for filtering a table list on the double clicked database or schema. Block 508 represents the computer 100 performing the retrieve function for all tables on the double clicked database or schema. Block 510 represents the computer 100 displaying an open database table list window.

Of course, those skilled in the art will recognize that the use of any mouse button, keyboard sequence, voice command, or other user input is merely a design choice, and the functions performed by the Filter Table List utility could be invoked by any number of different combinations of mouse buttons, keyboard sequences, voice command, or any other user input.

Conclusion

This concludes the description of the preferred embodiment of the invention. The following describes some alternative embodiments for accomplishing the present invention.

For example, any type of computer, such as a mainframe, minicomputer, work station, personal computer, or network computer could be used with the present invention. In addition, any software program, application or operating system having a graphical user interface could benefit from the present invention.

In summary, the present invention discloses a method, apparatus, and program storage device for displaying open database window in which search criteria is entered for searching for tables in a database or schema. A search is performed for tables in the database or schema using the entered search criteria, prior to retrieving names of all of the tables in the database or schema to display on the monitor. When tables are found that meet the search criteria, a list of the found tables is retrieved for displaying on the monitor. The retrieved list is displayed on the monitor.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method operable in a relational database management system which accesses a database to retrieve names of tables therein, visually displays the database table names in a dialog box and opens a database table based on a database table name entered into the dialog box, the method comprising:

(a) determining if the information entered into the dialog box includes user-defined search criteria in addition to the database table name;

(b) using a filter utility program located in the database management system to retrieve names of tables in the database that satisfy the search criteria when the information entered into the dialog box includes user-defined search criteria;

(c) using the database management system to retrieve names of all tables in the database when the information entered into the dialog box does not include user-defined search criteria; and (d) displaying the retrieved database table names in the dialog box.

2. The method of claim 1 wherein step (a) further comprises the step of:
  (a.1) determining if the search criteria contains a demarcation character preceding the database table name.

3. The method of claim 2 wherein the demarcation character comprises a backslash.

4. The method of claim 2 wherein the demarcation character comprises a dot.

5. A computer program product operable in a relational database management system which accesses a database to retrieve names of tables therein, visually displays the database table names in a dialog box and opens a database table based on a database table name entered into the dialog box, the computer program product comprising a computer usable medium having computer readable program code thereon, including:
  (a) program code configured to determine if the information entered into the dialog box includes user-defined search criteria in addition to the database table name;
  (b) filter utility program code that is loadable into the database management system and which is configured to retrieve names of tables in the database that satisfy the search criteria when the information entered into the dialog box includes user-defined search criteria;
  (c) program code that is configured to use the database management system to retrieve names of all tables in the database when the information entered into the dialog box does not include user-defined search criteria; and
  (d) program code that is configured to display the retrieved database table names in the dialog box.

6. The computer program product of claim 5 wherein the program code configured to determine if the information entered contains search criteria further comprises the program code configured to determine if the search criteria contains a demarcation character preceding the database table name.

7. The method of claim 6 wherein the demarcation character comprises a backslash.

8. The method of claim 6 wherein the demarcation character comprises a dot.

9. Apparatus operable in a computer system having a memory, a display and a relational database management system which accesses a database to retrieve names of tables therein, visually displays the database table names in a dialog box and opens a database table based on a database table name entered into the dialog box, the apparatus comprising:
  (a) program logic configured to determine if the information entered into the dialog box includes user-defined search criteria in addition to the database table name;
  (b) filter utility program logic located in the database management system configured to retrieve names of tables in the database that satisfy the search criteria when the information entered into the dialog box includes user-defined search criteria;
  (c) program logic configured to use the database management system to retrieve names of all tables in the database when the information entered into the dialog box does not include user-defined search criteria; and
  (d) program logic configured to display the retrieved database table names in the dialog box.

10. The apparatus of claim 9 wherein the program logic configured to determine if the information entered contains search criteria further comprises program logic configured to determine if the search criteria contains a demarcation character preceding the database table name.

11. The apparatus of claim 10 wherein the demarcation character comprises a backslash.

12. The apparatus of claim 10 wherein the demarcation character comprises a dot.

* * * * *